United States Patent
Piccin

(10) Patent No.: US 9,796,129 B2
(45) Date of Patent: Oct. 24, 2017

(54) METHOD FOR FORMING A TRIM ELEMENT HAVING A LAYER OF LIGNEOUS MATERIAL AND AN ENGRAVED PATTERN

(71) Applicant: Faurecia Innenraum Systeme GmbH, Hagenbach (DE)

(72) Inventor: Hugo Piccin, Deisenhofen (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 603 days.

(21) Appl. No.: 14/310,943

(22) Filed: Jun. 20, 2014

(65) Prior Publication Data
US 2014/0374951 A1 Dec. 25, 2014

(30) Foreign Application Priority Data
Jun. 25, 2013 (EP) .................................... 13173637

(51) Int. Cl.
*B29C 59/04* (2006.01)
*B29C 45/14* (2006.01)
(Continued)

(52) U.S. Cl.
CPC .......... *B29C 59/046* (2013.01); *B29C 43/021* (2013.01); *B29C 45/0055* (2013.01);
(Continued)

(58) Field of Classification Search
CPC .............. B29C 43/021; B29C 45/0055; B29C 45/14688; B29C 45/14754; B29C 45/14827; B29C 45/14811; B29C 59/046
(Continued)

(56) References Cited

U.S. PATENT DOCUMENTS 5,409,648 A * 4/1995 Reidel ............... B29C 45/14795
156/242
5,456,976 A * 10/1995 LaMarca, II ...... B29C 45/14811
428/317.1
(Continued)

FOREIGN PATENT DOCUMENTS

EP 1857268 A1 11/2007
EP 1859912 A1 11/2007
(Continued)

OTHER PUBLICATIONS

European Search Report for corresponding application No. EP 13 17 3637, Nov. 27, 2013, 6 pages.

*Primary Examiner* — Alison L Hindenlang
*Assistant Examiner* — Emmanuel S Luk
(74) *Attorney, Agent, or Firm* — Reising Ethington P.C.

(57) ABSTRACT

A vehicle trim element is formed by a method that includes the steps of: applying a film on the front face of a layer of ligneous material, with the applied film having at least one engraved pattern; placing the layer of ligneous material together with the applied film in a forming tool, with the front face of the layer being turned towards a wall of the forming tool; pressing the layer of ligneous material together with the applied film against the wall such that the layer adopts the shape of the trim element to be produced and such that, during the pressing of the layer and applied film, the engraved pattern is transferred to the front face of the layer; and removing the film after the pressing of the layer of ligneous material in order to obtain the trim element having a front face with the engraved pattern.

9 Claims, 1 Drawing Sheet

(51) Int. Cl.
*B29C 45/00* (2006.01)
*B29C 43/02* (2006.01)
*B29C 43/36* (2006.01)
*B29C 43/46* (2006.01)
*B29K 1/00* (2006.01)
*B29K 101/12* (2006.01)
*B29K 105/00* (2006.01)
*B29L 9/00* (2006.01)
*B29L 31/30* (2006.01)

(52) U.S. Cl.
CPC .. *B29C 45/14688* (2013.01); *B29C 45/14754* (2013.01); *B29C 45/14827* (2013.01); *B29C 43/3697* (2013.01); *B29C 45/14811* (2013.01); *B29C 2043/022* (2013.01); *B29C 2043/463* (2013.01); *B29C 2791/001* (2013.01); *B29K 2001/00* (2013.01); *B29K 2101/12* (2013.01); *B29K 2105/251* (2013.01); *B29K 2105/256* (2013.01); *B29L 2009/00* (2013.01); *B29L 2031/3005* (2013.01); *B29L 2031/3041* (2013.01)

(58) Field of Classification Search
USPC .................................................. 264/259, 266
See application file for complete search history.

(56) References Cited

U.S. PATENT DOCUMENTS

| | | | |
|---|---|---|---|
| 5,725,712 A | 3/1998 | Spain et al. | |
| 5,744,210 A * | 4/1998 | Hofmann | B29C 70/683 156/182 |
| 6,165,404 A * | 12/2000 | Savonuzzi | B29C 45/14811 264/259 |
| 6,187,233 B1 * | 2/2001 | Smith | B29C 45/14778 156/230 |
| 6,887,413 B1 * | 5/2005 | Schumacher | B29C 45/1418 264/135 |
| 2004/0185228 A1 * | 9/2004 | Yamamoto | B29C 45/14196 428/156 |
| 2006/0279015 A1 * | 12/2006 | Wang | B29C 45/14827 264/132 |
| 2007/0026197 A1 * | 2/2007 | Suga | B29C 45/14811 428/172 |
| 2007/0182063 A1 * | 8/2007 | Gwosdz | B29C 45/14008 264/259 |
| 2007/0184148 A1 * | 8/2007 | Toyooka | B29C 45/14016 425/542 |
| 2007/0199797 A1 * | 8/2007 | Sell | B29C 45/1418 198/335 |
| 2008/0292851 A1 * | 11/2008 | Egerer | B29C 43/18 428/196 |
| 2009/0149408 A1 * | 6/2009 | McSwiggen | A61K 49/0008 514/44 R |
| 2010/0276075 A1 * | 11/2010 | Manzoni | B29C 45/14221 156/245 |
| 2012/0001364 A1 * | 1/2012 | Shin | B29C 45/14827 264/275 |
| 2013/0075955 A1 * | 3/2013 | Piccin | B29C 45/1418 264/403 |

FOREIGN PATENT DOCUMENTS

| | | |
|---|---|---|
| JP | 2005169826 A | 6/2005 |
| WO | WO2011023899 A1 | 3/2011 |

* cited by examiner

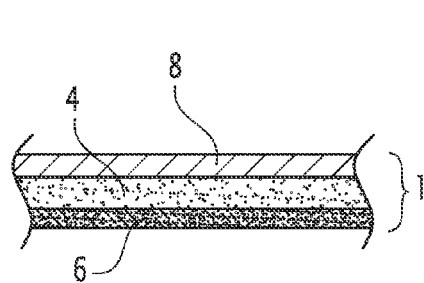
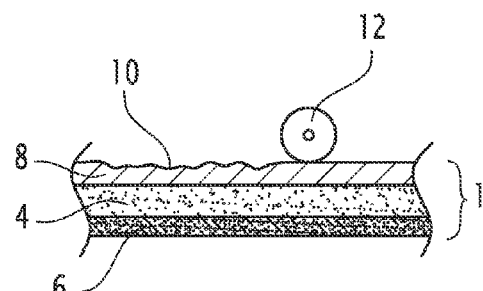
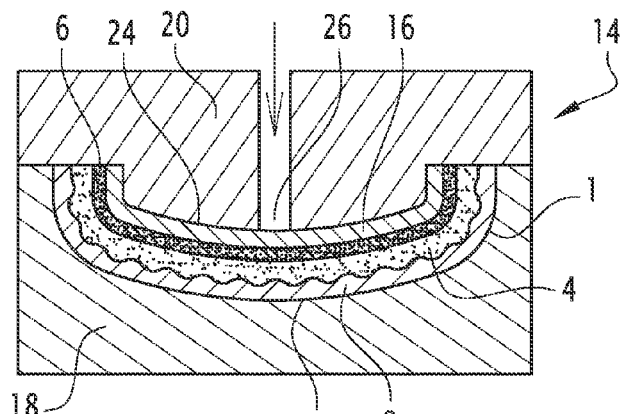
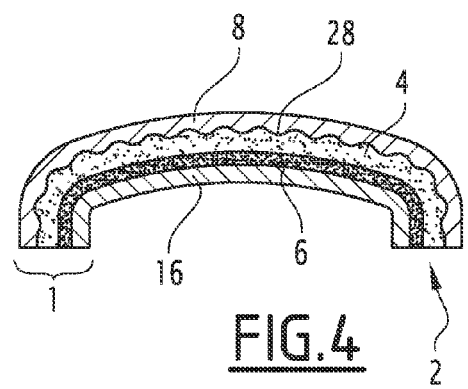
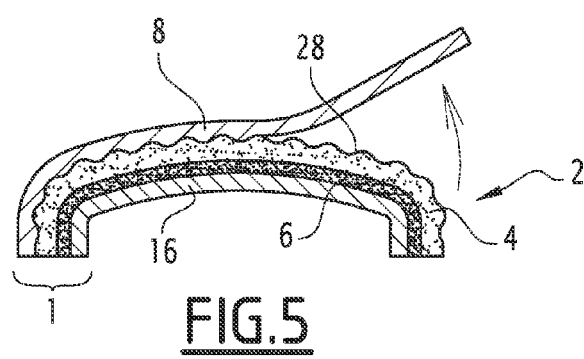

METHOD FOR FORMING A TRIM ELEMENT HAVING A LAYER OF LIGNEOUS MATERIAL AND AN ENGRAVED PATTERN

TECHNICAL FIELD

The present invention relates to a method for producing a vehicle trim element having a molded shape with an engraved pattern on a front face of the trim element.

BACKGROUND

Trim elements are for example used to line a part of the compartment of a vehicle, for example to cover a dashboard and/or a door panel or other parts of the compartment. In order to improve the aesthetics of the compartment, trim elements having the look of wood are particularly well liked. The trim elements comprise a layer of ligneous material, which can be made of natural wood or of a resin matrix comprising wood fibers for example, arranged to be visible from the exterior of the trim elements in order to confer a wood-like look to the trim element. In addition to the look of wood, a "woody" tactile feel is also well liked, i.e. the impression of touching natural wood when a user touches the trim element. In this regard, the layer of ligneous material can be treated, either manually or using a roller, to create an embossing on the visible face of the trim element. Documents EP-1 859 912 and WO-2007/061193 for example disclose such treatment of a layer of ligneous material.

When such a trim element is used to line a part of a vehicle compartment, a layer of ligneous material may be used which has to be flexible in order to allow its deformation such that it can conform to the three-dimensional shape of the part to be covered by the trim element. Therefore, the layers of ligneous material have to be as thin as possible to present such flexibility. However, in this case, the layer of ligneous material is not adapted to be embossed by a roller or by manual processing steps because these treatments require relatively thick layers of ligneous materials to emboss said layers without degrading them.

SUMMARY

One of the aims of the invention is to overcome these drawbacks by providing a method for producing a trim element adapted to acquire a three-dimensional shape while having the look and feel of wood.

To this end, the invention relates to a method of the afore-mentioned type, wherein the method comprises the following steps: applying a film on the front face of a layer of ligneous material, wherein the applied film has at least one engraved pattern; placing the layer of ligneous material together with the applied film in a forming tool, the front face of the layer being turned towards a wall of the forming tool; pressing the layer of ligneous material together with the applied film against the wall such that the layer adopts the shape of the trim element to be produced and such that, during the pressing of the layer and applied film, the engraved pattern is transferred to the front face of the layer; and removing the film after the pressing of the layer of ligneous material in order to obtain the trim element having a front face with the engraved pattern.

By transferring the engraved pattern from a film to the front face of the layer of ligneous material, the layer of ligneous material can be embossed without risking of degrading it whatever the thickness of the layer of ligneous material is. Consequently, a very thin layer of ligneous material can be employed, which makes the produced trim element adapted to be deformed into a three-dimensional shape.

According to a particular feature of this method, the trim element further comprises a support layer extending on the back side of the layer of ligneous material, the forming tool being an injection tool, the layer of ligneous material being placed in the injection tool such that its back face forms, with an opposite wall of the injection tool, an injection cavity having the shape of the support layer to be produced, the pressing of the layer of ligneous material being performed by injecting in the injection cavity an injection material in order to form the support layer on the back side of the layer of ligneous material.

When performing the pressing step during the injection step, it is possible to obtain an embossed trim element having a back layer in a single injection step, which reduces the number of steps of the method and makes it possible to have a high throughput for producing trim elements.

According to other features of the method according to the invention:

- the film is applied on the front face of the trim element prior to forming the engraved pattern on said film;
- the film is applied in a liquid form on the front face of the trim element and is cured prior to forming the engraved pattern on said film;
- the engraved pattern is formed by applying an engraved roller on the front face of the film, the engraved roller having a surface presenting a shape corresponding to the pattern to be engraved in the film;
- the trim element further comprises a backing layer attached to the back face of the layer of ligneous material, said backing layer being made of a flexible material and forming with the layer of ligneous material a flexible complex adapted to acquire a three-dimensional shape, said complex being placed and pressed in the forming tool such that it acquires the shape of the trim element to be produced;
- the flexible complex further comprises a coating layer applied on the front face of layer of ligneous material, the film being applied on said coating layer;
- the film is removed by peeling; and
- the pressing step takes place at a pressure substantially comprised between 50 bars and 600 bars.

BRIEF DESCRIPTION OF THE DRAWINGS

Other aspects and advantages of the invention will appear upon reading the following description, given by way of example and made in reference to the appended drawings, wherein:

FIG. 1 is a cross-section view of a complex comprising a layer of ligneous material used for producing a trim element, FIG. 2 is a cross-section view of the complex of FIG. 1 during a step of embossing the film of the complex, FIG. 3 is a cross-section view of the complex of FIG. 1 during a step of forming a support layer on the back face of the complex, FIG. 4 is a cross-section view of the trim element obtained after the step of FIG. 3, and FIG. 5 is a cross-section view of the trim element during the step of removing the film from the trim element.

DETAILED DESCRIPTION OF THE ILLUSTRATED EMBODIMENT(S)

In the following description, the term "front" is used to designate what is turned towards the exterior of the trim element, i.e. toward the inside of a vehicle compartment for example, and the term "back" is used to designate what is turned towards the interior of the trim element, i.e. toward the body of a vehicle for example.

In reference to FIG. 1, there is described a complex 1 forming the front of a trim element 2 to be produced with the complex 1.

The complex 1 comprises a layer of ligneous material 4. The layer of ligneous material 4 is for example formed of one layer of natural wood or of a superposition of wood layers. Alternatively, the layer of ligneous material can be formed of wood fibers embedded in a resin matrix or a layer of veneer. The layer of ligneous material 4 is sufficiently thin to have a certain flexibility and thus be adapted to be deformed up to a certain extent. The layer of ligneous material for example presents a thickness substantially between 0.1 and 2 mm. According to a particular embodiment, the thickness of the layer of ligneous material 4 is less than 0.5 mm.

According to the embodiment shown in the figures, the complex 1 further comprises a backing layer 6. The backing layer 6 extends directly on the back face of the layer of ligneous material 4 and is attached to said back face, for example by gluing. The back face 16 is made of a flexible material. By flexible, it is meant that the backing layer 6 is not rigid and can be shaped. The material of the backing layer is for example a textile, such as a woven or a non-woven fabric, or paper or cardboard or a film of plastic material.

The complex 1 formed by the assembly of the layer of ligneous material 4 and of the backing layer 6 is therefore flexible and is adapted to be deformed up to a certain extent, such that it can acquire a three-dimensional shape corresponding to the shape of the part to be lined by the trim element of the invention. The total thickness of the complex 1 is for example between 0.5 mm and 4 mm.

According to an embodiment (not shown), the complex 1 can further comprise a coating layer applied on the front face of the layer of ligneous material 4 et intended to form the visible face of the trim element, whereas the visible face is formed by the front face of the layer of ligneous material when the complex does not comprise the coating layer. The coating layer is for example a primer layer or a layer of polyurethane or a layer of varnish. The coating layer protects de layer of ligneous material from ultraviolet radiations which can cause an accelerated aging of the layer of ligneous material. The coating layer is further arranged such that the layer of ligneous material remains visible from outside the trim element by being translucent or transparent. The coating layer can also be arranged to modify the aspect of the layer of ligneous material, for example by being colored.

Prior to shaping the complex 1 described above to form the trim element, a film 8 is applied on the front face of the complex 1, i.e. on the front face of the layer of ligneous material 4 or on the front face of the coating layer. The film 8 is made of a plastic material, such as, for example, polyurethane (PUR), thermoplastic polyurethane (TPU), poly(methyl methacrylate) (PMMA) or polycarbonate (PC). The film has a thickness for example substantially between 0.5 mm and 2 mm, for example 1 mm. According to an embodiment, the film 8 is applied on the front face of the complex 1 in liquid form, for example by spraying or by napping. The film 8 is then allowed to cure, in order to form a layer covering the whole front face of the complex 1. Alternatively, the film 8 can be applied on the front face of the complex 1 in the form of a flexible foil. Alternatively, the film 8 can cover only part of the front face of the complex 1, for example a part that is intended to be visible in the compartment of the vehicle, while other parts, for example a peripheral part intended to be invisible in the compartment, is not covered by the film 8.

Once the film 8 is cured, an embossing step, shown in FIG. 2, occurs, in order to form an engraved pattern 10 on the front face of the film 8. By engraved pattern 10, it is meant that a relief is formed on the front face of the film 8, i.e. that recesses are created in the smooth surface of the film 8. The recesses can be arranged according to a particular pattern, for example to imitate the natural grain of wood by creating veins and so forth on the front face of the film. Alternatively, the pattern can be a geometrical shape or any other kind of shape chosen to appear on the front face of the trim element. The engraved pattern 10 formed on the front face of the film is a negative pattern relative to the pattern that will be engraved on the front face of the complex 1 after the method according to the invention is completed, as will be described later.

The embossing step is for example carried out by a roller 12 which is applied on the whole front face of the film 8 and which comprises on its surface a pattern, which is the negative of the pattern to be formed on the film. Consequently, the surface of the roller 12 comprises protrusions corresponding to the recesses to be formed in the film 8. Alternatively, the embossing step can be carried out by stamping, using a stamp having the negative pattern on one of its faces, said face being pressed against the film 8 to create the engraved pattern 10. Alternatively, the embossing step can be carried out by a plunger shaped as the negative pattern and applied on the whole front face of the film 8.

Alternatively, the pattern 10 could be formed on the film 8 before said film is applied to the front face of the complex 1. Alternatively, the pattern 10 could also be formed on the back face of the film before applying the film 8 on the front face of the complex 1.

Once the pattern 10 is formed on the film 8, the complex 1 and the film 8 are placed in a forming tool to shape the complex 1 according to the shape of the trim element to be produced.

According to the embodiment shown in FIG. 3, the forming tool is an injection tool 14 arranged to form a support layer 16 on the back face of the complex 1, i.e. on the back face of the backing layer 6 or directly on the back face of the layer of ligneous material if the complex 1 does not comprise a backing layer 6. However, the presence of a backing layer 6 is particularly advantageous since it forms a protection against the injection material for the layer of ligneous material.

The injection tool 14 comprises a first part 18 and a second part 20 movable relative to each other between an open position, wherein the complex 1 can be placed in the tool 14, and a closed position wherein a sealed injection cavity is defined between a wall 22 of the first part 18 and a wall 24 of the second part 20. The injection cavity has a shape corresponding to the shape of the trim element to be produced. The injection tool 14 further comprises means for injecting an injection material in the injection cavity. The injection means are for example formed by an injection nozzle 26 opening in the wall of the second part and placed in fluidic communication with the injection cavity.

The complex 1 is placed in the injection tool 14 in the open position such that the front face of the film 8 is applied against the wall of the first part 18 of the injection tool 14. The back face of the complex 1 therefore extends opposite the wall 24 of the second part 20 and defines with it a space having the shape of the support layer 16 to be formed on the back face of the complex 1.

The injection material is injected in the space between the back face of the complex 1 and the wall 24 of the second part 20. During the filling of this space, the injection material presses the complex against the wall 22 of the first part 18, and more particularly the engraved pattern 10 on the front face of the film 8 which is directly applied against the wall 22 of the first part 18. This causes the engraved pattern to be transferred from the front face of the film 8 to the back face of the film 8, which extends against the front face of the complex 1. The back face of the film 8 acts as a stamp against the front face of the complex 1 and embosses said front face such that an engraved pattern 28 is formed on the front face of the complex. The engraved pattern 28 is complementary of the engraved pattern 10 transferred from the front face to the back face, meaning that a protrusion in the engraved pattern 10 of the film 8 forms a recess in the front face of the complex. For a proper transfer of the engraved pattern from the film 8 to the front face of the complex, the pressure applied on the complex against the wall of the first part is for example comprised between 50 bars and 600 bars. At 50 bars, a transfer between the film 8 and the front face of the complex is obtained. Better results are obtained starting at a pressure of 120 bars. When the pressure reaches a value around 600 bars, it is possible to obtain a modification of the structure of the layer of ligneous material in addition to the transfer of the engraved pattern. The pressure applied on the complex and needed to transfer the engraved pattern depends mainly on the type of layer of ligneous material and/or on the type of coating layer applied on the layer of ligneous material.

Once the injection step is completed, the trim element 2 comprising the complex 1 and the support layer 16 is removed from the injection tool 14 with the film 8 still extending on the front face of the complex 1, as shown in FIG. 4. The film 8 is then removed from the front face of the complex 1, for example by peeling as shown in FIG. 5 to obtain a trim element having an engraved pattern 28 on its front face. The film 8 can also be used as a surface protection element for protecting the front face of the complex, for example during transportation of the trim element from one site of production to another site or during the storage of the trim element. The film 8 can then prevent the layer of ligneous material from drying and protect the trim element from any alteration. The film 8 can be removed only just before another manufacturing step takes place, for example a varnishing step. Alternatively, the film 8 could only be removed once the trim element is installed in a vehicle or just before the installation, if no further manufacturing step is needed.

The method described above is particularly simple to carry out and allows obtaining a trim element with a visible face having the appearance as well as the feeling of a wood layer. Such a trim element can be used to line a part of a compartment of a vehicle and gives a particularly attractive appearance. Furthermore, since the embossing is applied by the film 8, there is no need to provide an embossing on the wall of the first part of the forming tool. Consequently, the forming tool is less expensive and the engraved pattern can easily be modified from one trim element to the other simply by modifying the pattern formed on the film, without needing to modify the forming tool.

In the method described above, the pressure of the injection material against the complex is used to create the engraved pattern on the front face of the complex 1, which allows forming the support layer 16 and the pattern in a single injection step. The support layer 16 is for example a substantially rigid layer and helps maintaining the complex 1 in its three-dimensional shape and reinforces the trim element 2. The support layer 16 is for example made of a plastic material or of a composite material comprising natural fibers embedded in a plastic material. Such a composite material is known as a NFC (natural fiber composite). The natural fibers are for example wood, flax fibers or other natural fibers. The plastic material fibers are for example polypropylene or polyethylene therephthalate fibers which are melted around the natural fibers to form a coherent element wherein the natural fibers are linked to each other by plastic material.

The method is however not limited to the use of an injection tool. The forming tool can alternatively be a compression tool or a thermocompression tool used to attach a complex with a preformed support layer 16. Alternatively, the complex 1 can be used directly as a trim element without a support layer. In that case the forming tool can simply be a compression tool arranged to deform and shape the complex 1 alone. In this case, the pressure applied to the front face of the film is applied directly by the second part of the tool which presses on the back face of the complex.

The complex has been described as comprising two or three layers. However, it is to be understood that the complex could comprise more layers, on its front face and/or on its back face.

The invention claimed is:

1. Method for producing a trim element comprising at least one layer of ligneous material, a front face of the trim element comprising at least one engraved pattern, the method comprising the following steps:
providing a film having a back face and a front face;
applying the back face of the film on a front face of a layer of ligneous material, wherein the applied film has at least one engraved pattern on the front face of the film;
placing the layer of ligneous material together with the applied film in a forming tool, the front face of the layer being turned towards a wall of the forming tool;
pressing the layer of ligneous material together with the applied film against the wall such that the layer adopts the shape of the trim element to be produced and such that, during the pressing of the layer and applied film, the engraved pattern is transferred from the front face of the film to the front face of the layer; and
removing the film after the pressing of the layer of ligneous material in order to obtain the trim element having a front face with the engraved pattern.

2. Method according to claim 1, wherein the trim element further comprises a support layer extending on a back side of the layer of ligneous material, the forming tool being an injection tool, the layer of ligneous material being placed in the injection tool such that its back face forms, with an opposite wall of the injection tool, an injection cavity having the shape of the support layer to be produced, the pressing of the layer of ligneous material being performed by injecting in the injection cavity an injection material in order to form the support layer on the back side of the layer of ligneous material.

3. Method according to claim 1, wherein the film is applied on the front face of the layer of ligneous material prior to forming the engraved pattern on the film.

4. Method according to claim 3, wherein the film is applied in a liquid form on the front face of the layer and is cured prior to forming the engraved pattern on the film.

5. Method according to claim 3, wherein the engraved pattern is formed by applying an engraved roller on the front face of the film, the engraved roller having a surface presenting a shape corresponding to the pattern to be engraved in the film.

6. Method according to claim 1, wherein the trim element further comprises a backing layer attached to the back face of the layer of ligneous material, the backing layer being made of a flexible material and forming with the layer of ligneous material a flexible complex adapted to acquire a three-dimensional shape, the complex being placed and pressed in the forming tool such that it acquires the shape of the trim element to be produced.

7. Method according to claim 6, wherein the flexible complex further comprises a coating layer applied on the front face of layer of ligneous material, the film being applied on the coating layer.

8. Method according to claim 1, wherein the film is removed by peeling.

9. Method according to claim 1, wherein the pressing step takes place at a pressure substantially comprised between 50 bars and 600 bars.

\* \* \* \* \*